(12) United States Patent
Kishida et al.

(10) Patent No.: US 6,661,370 B2
(45) Date of Patent: Dec. 9, 2003

(54) RADAR DATA PROCESSING APPARATUS AND DATA PROCESSING METHOD

(75) Inventors: Masayuki Kishida, Kobe (JP); Sadanori Matsui, Kobe (JP); Yasuhiro Sekiguchi, Kobe (JP); Tokio Shinagawa, Kobe (JP); Daisaku Ono, Kobe (JP)

(73) Assignee: Fujitsu Ten Limited (JP)

( * ) Notice: Subject to any disclaimer, the term of this patent is extended or adjusted under 35 U.S.C. 154(b) by 0 days.

(21) Appl. No.: 10/314,655

(22) Filed: Dec. 9, 2002

(65) Prior Publication Data

US 2003/0122703 A1 Jul. 3, 2003

(30) Foreign Application Priority Data

Dec. 11, 2001 (JP) ........................................ 2001-377651
Dec. 11, 2001 (JP) ........................................ 2001-377670

(51) Int. Cl.[7] .......................... G01S 13/34; G01S 13/93
(52) U.S. Cl. ........................... 342/128; 342/27; 342/28; 342/70; 342/104; 342/105; 342/109; 342/115; 342/118; 342/159; 342/175; 342/195
(58) Field of Search ............................. 342/27, 28, 70, 342/71, 72, 118, 127–133, 147, 175, 195, 104–115, 159–165, 169–174, 189–194, 196, 197; 701/300, 301

(56) References Cited

U.S. PATENT DOCUMENTS

| | | | | | |
|---|---|---|---|---|---|
| 4,322,832 | A | * | 3/1982 | Sartorius | .................... 368/47 |
| 5,483,242 | A | * | 1/1996 | Grein et al. | ................. 342/111 |
| 5,619,208 | A | * | 4/1997 | Tamatsu et al. | ............... 342/70 |
| 5,731,778 | A | * | 3/1998 | Nakatani et al. | .............. 342/70 |
| 5,940,024 | A | * | 8/1999 | Takagi et al. | ................. 342/70 |
| 6,072,422 | A | * | 6/2000 | Yamada | ....................... 342/70 |
| 6,140,954 | A | * | 10/2000 | Sugawara et al. | ............ 342/70 |
| 6,204,803 | B1 | * | 3/2001 | Uehara | ........................ 342/70 |
| 6,229,474 | B1 | * | 5/2001 | Uehara | ........................ 342/70 |
| 6,320,531 | B1 | * | 11/2001 | Tamatsu | .................... 342/109 |

FOREIGN PATENT DOCUMENTS

| | | | |
|---|---|---|---|
| JP | A-5-142338 A | 6/1993 | .................. 342/109 |
| JP | A-5-249232 A | 9/1993 | .................. 342/42 |

(List continued on next page.)

Primary Examiner—Bernarr E. Gregory
(74) Attorney, Agent, or Firm—Fogg and Associates, LLC

(57) ABSTRACT

The invention detects a ghost occurring due to mispairing, reflections from a wall, or the like, and improves the ability of a radar to track targets when actual relative velocity changes by more than a certain value. If a stationary target is present within a prescribed region centered about a moving target, the stationary target is excluded from output data by determining it as being a target resulting from mispairing due to the detection of guardrail posts or similar structures. Further, a moving target that is expected to collide with an eligible target is also excluded from the output data by determining it as being a target resulting from mispairing due to the detection of a target having many reflecting points. For a moving target showing an unlikely relative velocity, pairing with some other peak is attempted by determining the moving target as being a target resulting from mispairing due to the detection of a plurality of moving targets moving in the same direction. When there are two targets substantially equal in distance and velocity, the target located outward, as viewed from the radar-equipped vehicle, is excluded from the output data by determining it as being a ghost occurring due to reflections from a wall or like structure. After checking continuity, if the present data is not one calculated by extrapolation but the previous data is one calculated by extrapolation, filtering calculations are not performed for the calculation of the relative velocity; in other cases, the filtering calculations are performed.

18 Claims, 11 Drawing Sheets

FOREIGN PATENT DOCUMENTS

| | | | | |
|---|---|---|---|---|
| JP | A-5-249233 A | 9/1993 | ................... | 342/42 |
| JP | A-6-207979 A | 7/1994 | ................... | 342/90 |
| JP | A-9-80151 A | 3/1997 | ........... | G01S/13/60 |
| JP | 1020025 A * | 1/1998 | ........... | G01S/13/38 |
| JP | A-11-211811 A | 8/1999 | ........... | G01S/13/34 |
| JP | A-11-231053 A | 8/1999 | ........... | G01S/13/93 |
| JP | P2000-81480 A | 3/2000 | ........... | G01S/13/34 |
| JP | P2000-321352 A | 11/2000 | ........... | G01S/13/34 |
| JP | P2000-21647 A | 1/2001 | ........... | G01S/13/93 |
| WO | WO-02063337 A1 * | 8/2002 | ........... | G01S/13/34 |

* cited by examiner

DISTANCE

ANGLE OR LATERAL POSITION

RADAR DATA PROCESSING APPARATUS AND DATA PROCESSING METHOD

This application claims priority to Japanese Patent Application Nos. 2001-377670 and 2001-377651, both filed on Dec. 11, 2001.

BACKGROUND OF THE INVENTION

1. Field of the Invention

The present invention relates to a radar data processing apparatus and data processing method for calculating the distance and relative velocity of a target based on peak data output from a radar apparatus, and for outputting data representing the results.

2. Description of the Related Art

A millimeter-wave radar (FM-CW radar) projects forward a continuous wave beam frequency-modulated by a triangular wave increasing and decreasing alternately in a cyclic fashion, receives an echo signal from a target, and produces a beat signal by mixing the echo signal with a portion of the transmitted signal; then, peaks appearing in the frequency spectrum of the beat signal are paired up between the increasing section and the decreasing section of the frequency modulation (hereinafter called the pairing), and the distance and the relative velocity of the target are calculated from the sum of, and the difference between, the frequencies of the paired peaks. Further, by physically or electronically scanning the beam projection angle, the direction in which the target is located can be determined. It is also possible to determine the absolute speed of the target, and more specifically, whether the target is stationary (a stationary target) or moving (a moving target), by knowing the traveling speed of the radar-equipped vehicle using a vehicle speed sensor.

In the above pairing process, between the peaks (up peaks) in the beat signal (up beat) during the increasing part of the frequency modulation and the peaks (down peaks) in the beat signal (down beat) during the decreasing part thereof, peaks close in angle and intensity are paired together as peaks occurring due to the same target.

Further, in order to determine each individual target, data continuity is checked by comparing the present data with the past data and determining whether the data are data obtained from the same target. For example, if a certain object has been recognized more than a predetermined number of times within a predetermined period of time, then the object is determined as being an eligible target.

Roadside objects installed at closely spaced intervals, such as guardrail posts, cause many reflections in rapid succession. In this case, as many peaks close in intensity appear within a narrow angle range, mispairing tends to occur in which peaks caused by different targets are paired up. Further, in the case of a moving target such as a large truck having many reflecting points at its rear end, such as tires, a car carrier, etc., many peaks tend to occur within a narrow angle range, which can also result in mispairing. Also, in the case of different targets, mispairing tends to occur if they are close in angle.

Further, if the radar beam hits a target after being reflected by a roadside wall or like structure, a mirror ghost occurs. If such a mirror ghost occurs, it may be erroneously determined in the continuity check that there is continuity between the real target in the past data and the mirror ghost in the present data, resulting in an inability to check the continuity of the real target in the present data, or an erroneous calculation of the lateral position of the target with the real target being united with the mirror ghost.

In the continuity check where the present data is compared with the past data to determine whether the data is from the same target, filtering calculations using, for example, the following equations are performed on the distance and relative velocity data that have been determined as being from the same target.

[Relative velocity]=([Previous value]×3+[Present value])/4

[Distance]=([Previous value]+[Present value])/2

The pairing process consists of two steps: pairing based on the past, for preferentially pairing up the peaks existing within the predicted frequency range where the target is expected to exist based on the position and velocity predicted from the past data, and new pairing for pairing up the peaks remaining after the completion of the pairing based on the past. In the pairing based on the past, if one or both of the peaks are temporarily nonexistent within the predicted range, extrapolation is performed for a predetermined period of time by assuming that the target is present at the predicted position. When the distance to the target is decreasing, up peaks at low frequencies tend to disappear, and the extrapolation performed in this case is called the down beat extrapolation.

The predicted values of the target data are calculated from the following equations by assuming that the previously calculated relative velocity is applicable to the present data.

[Distance]=[Previously calculated distance]+[Previously calculated relative velocity]×[Time]

[Relative velocity]×[Previously calculated relative velocity]

FIG. 1 shows the frequencies of a down peak 10 and up peak 12 changing with time when the distance to a target traveling in front decreases and then increases slightly, finally settling down to maintain a constant distance. The sum of the frequencies of the two peaks corresponds to the distance to the target, and the difference corresponds to the relative velocity.

Assume here that, as shown in FIG. 2, at time $t_1$ the frequency of the up peak drops and the peak cannot be detected, whereupon the down beat extrapolation is initiated. As the distance is given by the sum of the two frequencies, if the scale is taken properly, the distance can be represented by a semi-dashed line, indicated by reference numeral 14, drawn between the two frequencies. As previously described, as the estimated position of the target is calculated by assuming that the relative velocity is constant during the down beat extrapolation, if the filtering calculations are performed, the estimated value 14 of the distance decreases substantially linearly, and the estimated frequency 16 of the down peak and the estimated frequency 18 of the up peak also decrease substantially linearly with essentially the same slopes. Accordingly, if the actual relative velocity decreases, decreasing the frequency difference, and the frequency of the down peak stops further decreasing, the disparity between the actual and estimated values increases and finally, at time $t_2$, the down peak goes outside the predicted range and a new pairing is initiated. At time $t_3$, if the up peak is detected here, since it is still outside the predicted range, the down beat extrapolation is initiated once again. Thereafter, at time $t_4$, the down peak goes outside the predicted range, and the new pairing is initiated, but at time $t_5$, the up peak goes outside the predicted range, and the down beat extrapolation is initiated once again.

In this way, the prior art has had the problem that, if the actual relative velocity changes by more than a certain value during the extrapolation, it takes a finite time until the output value comes to reflect the actual value.

SUMMARY OF THE INVENTION

A first object of the present invention is to increase the accuracy of radar measurements by quickly detecting the occurrence of mispairing, a mirror ghost, etc.

A second object of the present invention is to provide a radar data processing apparatus that can quickly recover if the actual relative velocity changes during extrapolation.

According to the present invention, there is provided a data processing apparatus for a millimeter-wave radar, which receives data concerning peaks appearing in a frequency spectrum of a beat signal produced by mixing a received signal with a portion of a transmitted signal frequency-modulated by a triangular wave increasing and decreasing alternately in a cyclic fashion, and which processes the peak data for the increasing and decreasing sections of the triangular wave for a plurality of angles, comprising: means for determining pairing between the peaks in the increasing section of the triangular wave and the corresponding peaks in the decreasing section thereof; means for calculating, from the frequencies of the paired peaks, a distance to each individual target and the relative velocity of the target; and means for determining an ineligible target based on the calculated relative velocity.

The apparatus further comprises means for determining whether each individual target is a stationary target or a moving target, based on the traveling speed of a vehicle equipped with the radar and the relative velocity of the target, and in one example, the ineligible target determining means determines that any moving target that, according to the calculated values of the distance and relative velocity, is supposed to be present in the vicinity of a stationary target is an ineligible target.

The apparatus further comprises means for determining an eligible target based on continuity with past data, and in one example, the ineligible target determining means determines that any target that, according to the calculated values of the distance and relative velocity, is expected to virtually collide with the eligible target is an ineligible target.

In another example, the ineligible target determining means determines that any target for which the calculated value of the relative velocity is an unlikely value is an ineligible target.

In still another example, when there are two moving targets exhibiting substantially the same motion according to the calculated values of the distance and relative velocity, the ineligible target determining means determines that the moving target located outward of the other target is an ineligible target.

The apparatus further comprises means for determining whether each individual target is a stationary target or a moving target, based on the traveling speed of the radar-equipped vehicle and the relative velocity of the target, and the ineligible target determining means determines that any moving target that is located outward of a stationary target according to the calculated values of the distance and relative velocity is an ineligible target.

According to the present invention, there is also provided a data processing apparatus for a millimeter-wave radar, which receives data concerning peaks appearing in a frequency spectrum of a beat signal produced by mixing a received signal with a portion of a transmitted signal frequency-modulated by a triangular wave increasing and decreasing alternately in a cyclic fashion, and which processes the peak data for the increasing and decreasing sections of the triangular wave for a plurality of angles, comprising: means for determining pairing between the peaks in the increasing section of the triangular wave and the corresponding peaks in the decreasing section thereof; means for calculating, from the frequencies of the paired peaks, a distance to each individual target and the relative velocity of the target; means for grouping together peaks substantially equal in frequency and distributed within a prescribed angle range, by determining that the peaks are due to reflections from the same target; and means for determining that, if the number of peaks belonging to the same group is smaller than a predetermined value, that the peaks belonging to the same group are ineligible peaks.

Preferably, the ineligible peak determining means determines that any peak having an intensity greater than a predetermined threshold value is an eligible peak even when the number of peaks belonging to the same group is smaller than the predetermined value.

According to the present invention, there is also provided a radar data processing apparatus comprising: means for checking continuity to determine whether previously obtained target data and currently obtained target data are data obtained from the same target; means for performing filtering calculations on the target data that has been determined as being data from the same target as a result of the continuity check; and means for prohibiting the filtering calculations from being performed for the calculation of the relative velocity of the target contained in the target data, if the currently obtained target data is data calculated from currently obtained actual measured values, and if the previously obtained target data is data calculated by extrapolation, not from actual measured values.

The reason that it takes a finite time to recover is that, as can be seen from the example of FIG. 2, if new pairing is done after extrapolation, the estimated value does not come close to the actual value because of the filtering calculations of the relative velocity. In view of this, in order to achieve quick recovery, provisions are made not to perform the filtering calculations of the relative velocity, if the current data is data obtained by new pairing, and if the previous data is data calculated by extrapolation.

DESCRIPTION OF THE PREFERRED EMBODIMENTS

Figure 3:
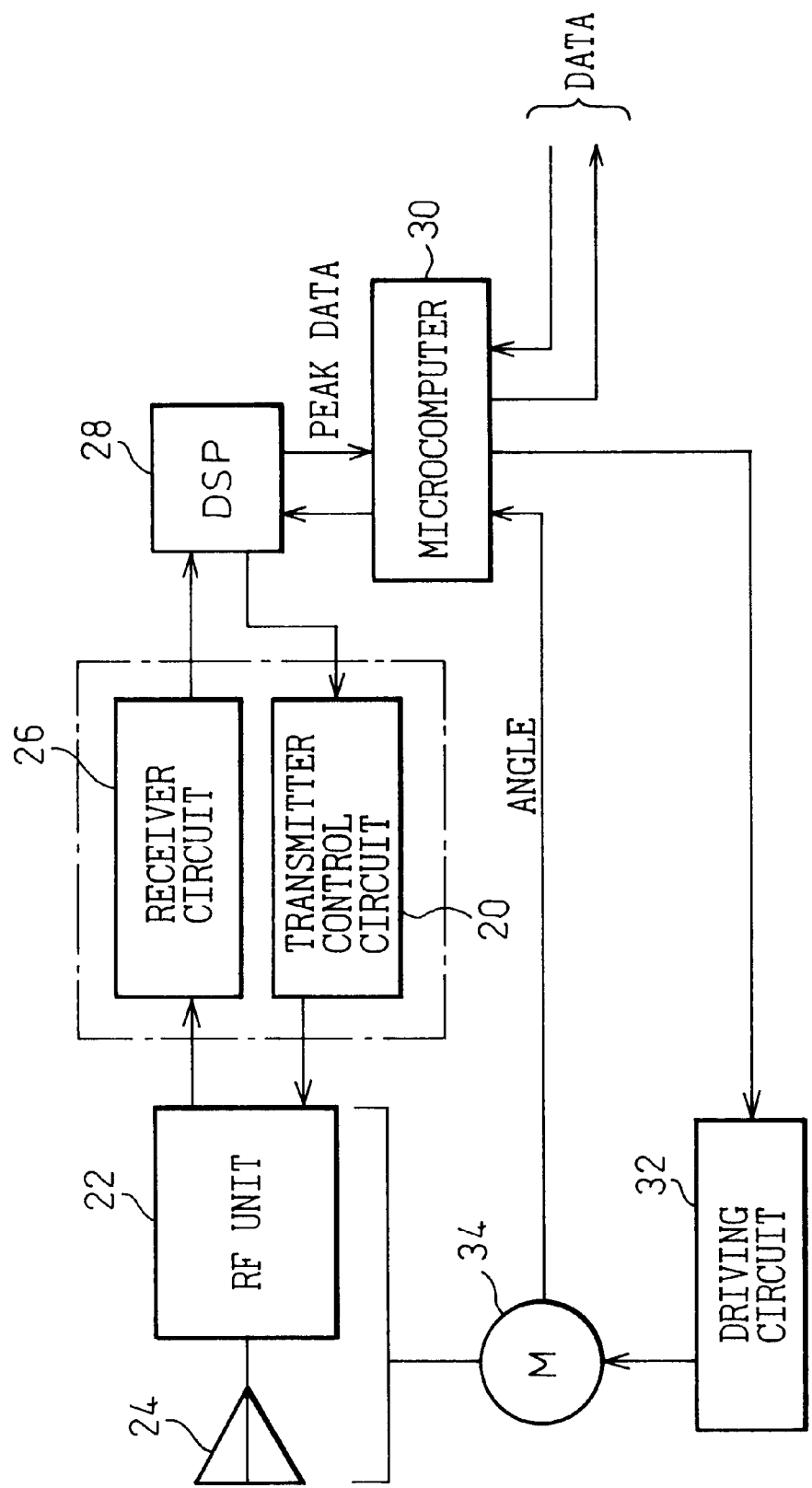
FIG. 3 is a block diagram showing one configuration example of a millimeter-wave radar to which the present invention is applied.

FIG. 3 shows one configuration example of a millimeter-wave radar apparatus to which the present invention is applied. In FIG. 3, a transmitter control circuit 20 outputs a triangular wave increasing and decreasing alternately in a cyclic fashion. An RF unit 22 generates a millimeter wave frequency-modulated by the triangular wave, and the frequency-modulated wave is radiated from an antenna 24. An echo signal from a target is received by the antenna 24, and the received echo signal is mixed in the RF unit 22 with a portion of the transmitted signal to produce a beat signal having a frequency equal to the difference between the transmitted signal and the echo signal. The beat signal is converted in a receiver circuit 26 to the baseband signal which is fed into a DSP 28. In the DSP 28, conversion from the time domain to the frequency domain is performed by applying FFT on each of the increasing section (up beat) and decreasing section (down beat) of the triangular wave. Further, the DSP 28 extracts peaks (up peaks) in the increasing section and peaks (down peaks) in the decreasing section from the frequency spectrum of the signal, and supplies them to a microcomputer 20. On the other hand, a driving circuit 32 scans the projection direction of the antenna 24 by driving a motor 34, and supplies angle data obtained at each instant in time to the microcomputer 30. Based on the intensity of each peak, the antenna angle at that instant in time, and continuity with the previous data, the microcomputer 30 pairs the up peaks one for one with the corresponding down peaks (pairing). From the sum of the frequencies of the paired two peaks, the distance to each individual target is calculated, while from the difference between the frequencies of the two peaks, the relative velocity of each individual target is calculated, and the calculated results are output. The lateral position X of the target is calculated from X=R sin θ, where R is the distance to the target and θ is the angle at which the target is located. The microcomputer 20 also performs continuity check to track each target based on the target's position and relative velocity data changing from moment to moment.

Figure 4:
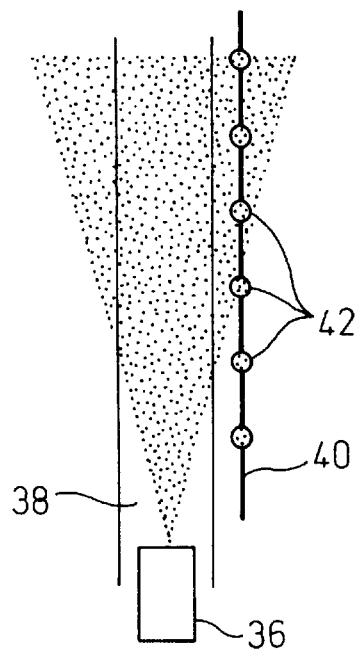
FIG. 4 is a diagram showing one example of a guardrail located on the roadside.
Figure 5:
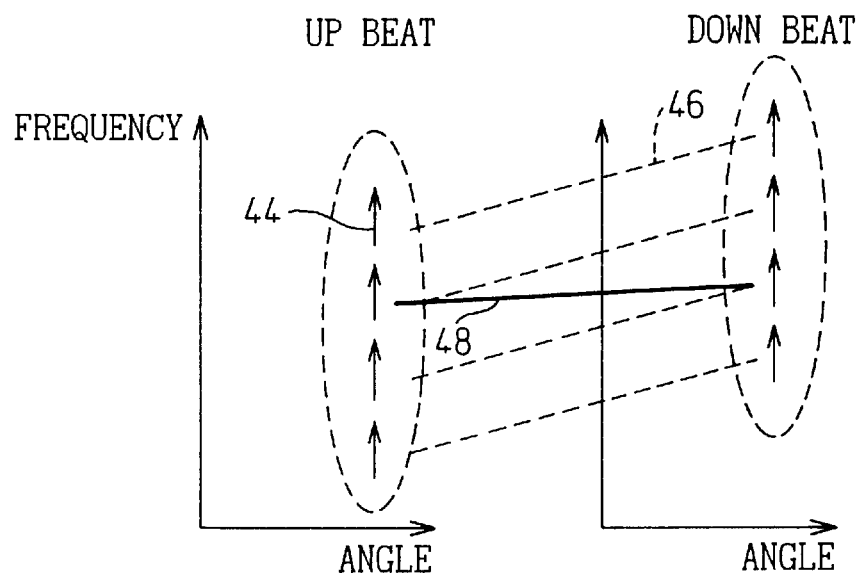
FIG. 5 is a diagram for explaining the occurrence of mispairing due to the presence of the roadside guardrail.

For example, when there is a guardrail 40 on the roadside of the lane 38 in which the radar-equipped vehicle 36 is traveling, as shown in FIG. 4, many peaks appear one spaced apart from another in the same angle direction due to the guardrail posts 42, as shown in FIG. 5. In FIG. 5, the up beat is shown in the left side, and the down beat in the right side. The beam angle is plotted as abscissa and the frequency as ordinate, and the peaks extending in the direction perpendicular to the page are each indicated by an upward pointing arrow 44. This method of designation also applies to the diagrams hereinafter given.

New pairing between an up peak and a down peak is performed based on the angle and the peak intensity. In the case of FIG. 5, the respective peaks should normally be paired correctly as shown by dashed lines. However, in the case of a structure such as guardrail posts due to which many peaks appear successively in the same angle direction, erroneous pairing (mispairing) as shown by a solid line in the figure tends to occur.

Figure 6:
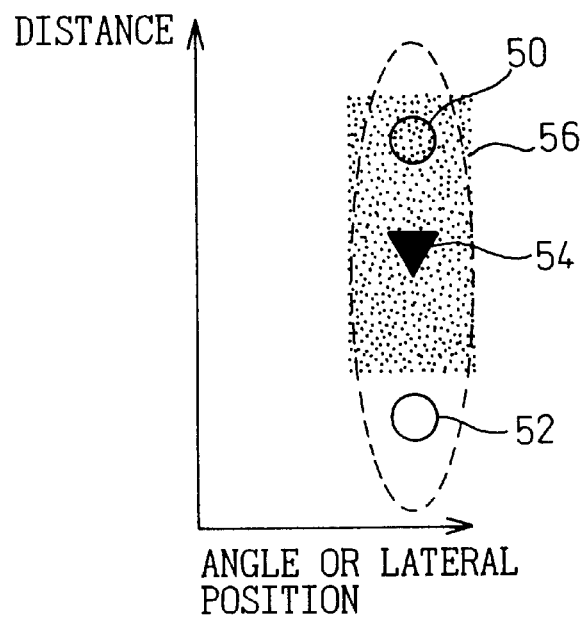
FIG. 6 is a diagram for explaining the occurrence of a ghost due to mispairing caused by the roadside guardrail and a method of eliminating the ghost.

If such mispairing occurs, a moving target 54 indicated by a solid triangle in FIG. 6 appears in the vicinity of stationary targets 50 and 52 indicated by open circles. This is because the relative velocity, which is calculated from the difference between the down peak frequency and the up peak frequency, is greatly affected by the mispairing, whereas the distance and the angle or lateral position are relatively unaffected by the mispairing because the distance to the target is calculated from the sum of the frequencies of the two peaks and the lateral position of the target is calculated from the distance and angle.

Accordingly, in the present invention, any moving target that is present in the vicinity of a target determined as being stationary is excluded from the output data by determining that such a moving target has occurred due to mispairing. The vicinity here means that the difference in distance and the difference in angle or lateral position are within their respective upper limit values. For example, when the stationary target 50 is located in a region 56, shown by shading in FIG. 6, the moving target 54 is determined as being a target occurring due to mispairing, and is excluded from the output data.

The above-described process and the process described hereinafter are implemented by software which is stored in and executed by the microcomputer 30 (FIG. 3).

Figure 7:
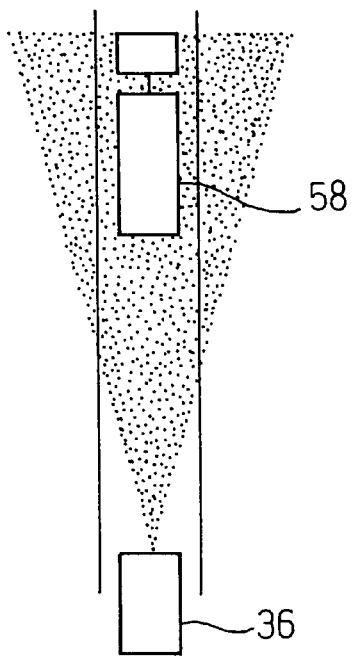
FIG. 7 is a diagram showing one example of a target having many reflecting points.
Figure 8:
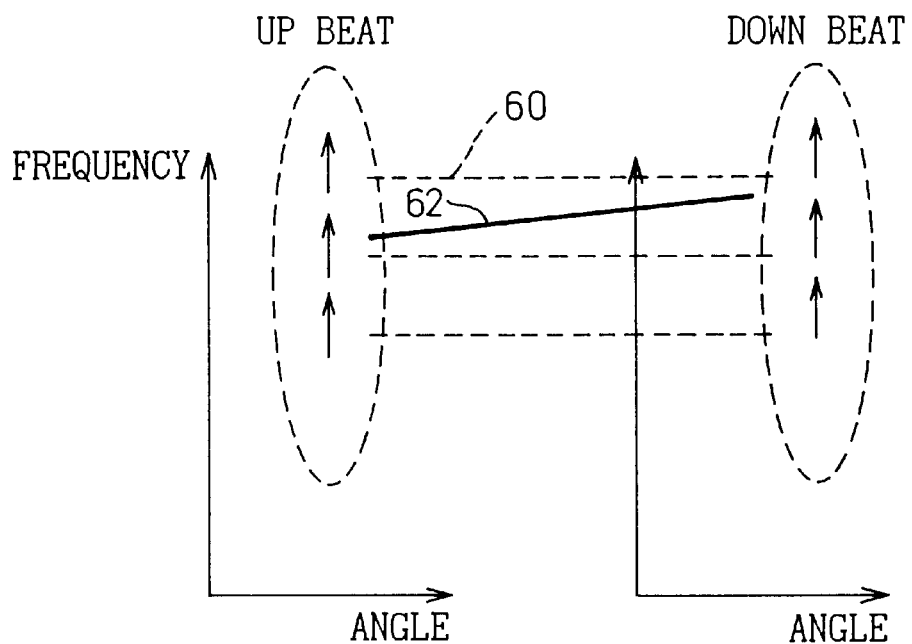
FIG. 8 is a diagram for explaining the occurrence of mispairing due to the presence of the target having many reflecting points.
Figure 9:
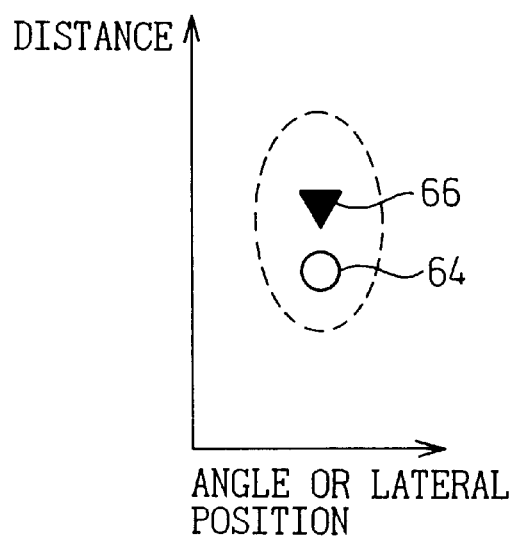
FIG. 9 is a diagram for explaining the occurrence of a ghost due to mispairing caused by the target having many reflecting points and a method of eliminating the ghost.

When a target 58, such as a large truck, that has many reflecting points is traveling in front of the radar-equipped vehicle 36 as shown in FIG. 7, many peaks also occur within the same angle range as shown in FIG. 8. In this case, if mispairing shown by a solid line 62 is done instead of the correct pairing shown by dashed lines 60, a moving target 66 occurs as shown in FIG. 9 as if it is going to collide with a reliable moving target 64. As earlier described, this is because the relative velocity data is greatly affected by the mispairing, whereas the distance and the angle or lateral position are relatively unaffected. The reliable target here means, for example, a target determined as being an eligible target by being recognized more than a predetermined number of times within a predetermined period of time in the earlier described continuity check.

Accordingly, any moving target that is expected to collide with the eligible moving target according to the calculated distance and relative velocity, that is, any moving target whose positional relationship to the eligible target is expected to be reversed after time Δt predicted based on their relative velocities, for example, is determined as being a moving target occurring due to mispairing and is excluded from the output data.

Figure 10:
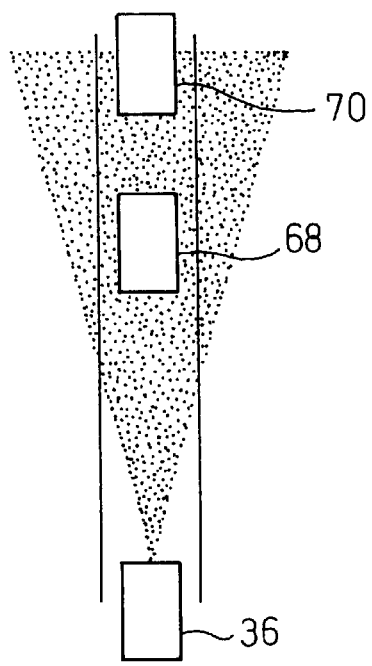
FIG. 10 is a diagram showing one example of a plurality of moving targets that tend to cause mispairing.
Figure 11:
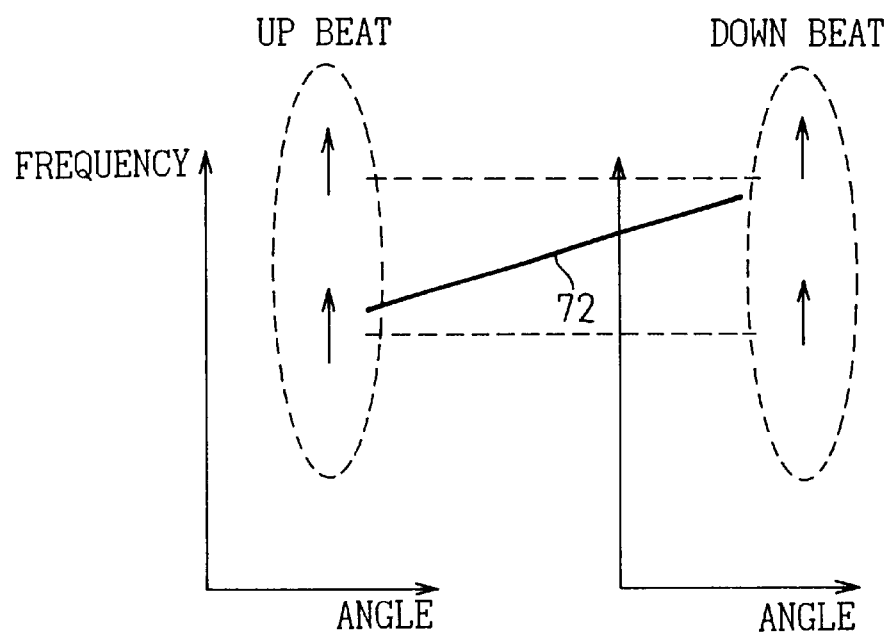
FIG. 11 is a diagram for explaining the occurrence of mispairing due to the presence of the plurality of moving targets.

Further, when there are a plurality of moving targets 68 and 70 traveling in the same direction in front of the radar-equipped vehicle 36 as shown in FIG. 10, peaks also occur in substantially the same angle direction in both the up beat and down beat sections, as shown in FIG. 11. In this case also, mispairing can occur as shown by a solid line 72. In this case, if the calculated relative velocity shows an unlikely value such as 200 km/h or higher, pairing with such a peak is not done, and pairing with another peak is attempted.

Figure 12:
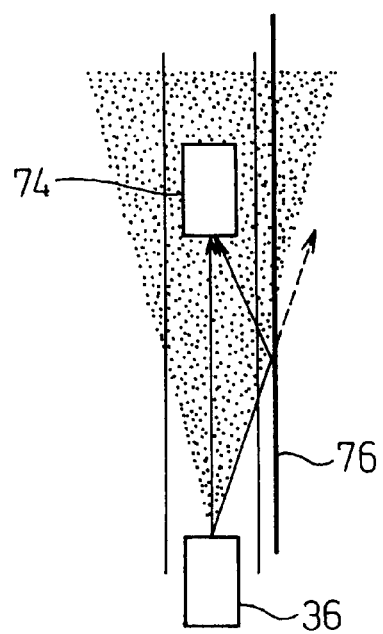
FIG. 12 is a diagram for explaining a reflection from a wall.
Figure 13:
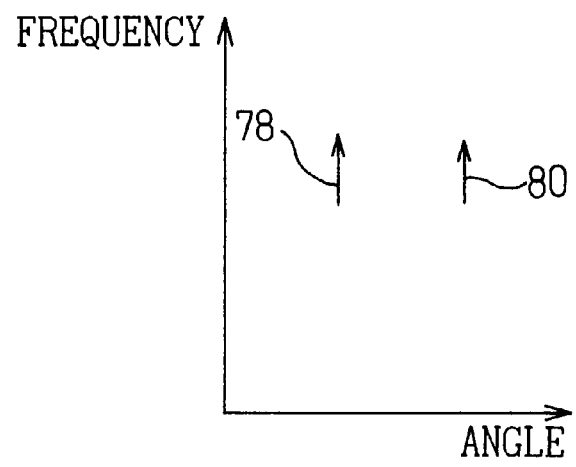
FIG. 13 is a diagram for explaining a normal peak and a peak due to the reflection from the wall.
Figure 14:
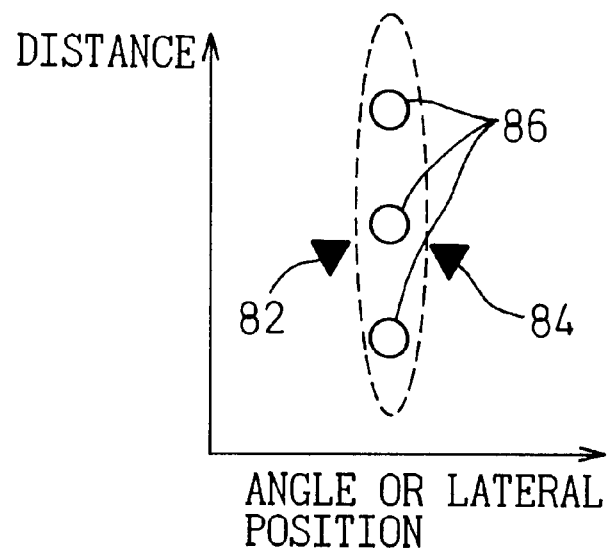
FIG. 14 is a diagram for explaining the intended target, a ghost due to the reflection from the wall, and a method of detecting the same.

When there is a target 74 traveling near a wall 76 as shown in FIG. 12, multiple reflected waves are received, one returned directly from the target 74 and the other after being reflected by the wall 76. In this case, as shown in FIG. 13, a peak 80 due to the reflection from the wall occurs in addition to the peak 78 due to the reflection from the target and, as shown in FIG. 14, a ghost 84 appears in the analysis result along with the real target 82.

In this case, though the real target 82 and the ghost 84 differ in angle or lateral position, they exhibit substantially the same motion in terms of the distance and relative velocity; as a result, the ghost 84, when viewed from the radar-equipped vehicle, is located laterally outside the real target 82. Accordingly, for example, when two targets are present, if the differences in distance and relative velocity are not larger than their respective upper limit values, and if the difference in angle or lateral position is smaller than a predetermined upper limit value, the target larger in angle θ or in lateral position X is determined as being a ghost and is excluded from the output data. As shown in FIG. 14, when there is data of a stationary target 86 due to the wall, the target 84 located outside it is determined as being a ghost.

Figure 15:
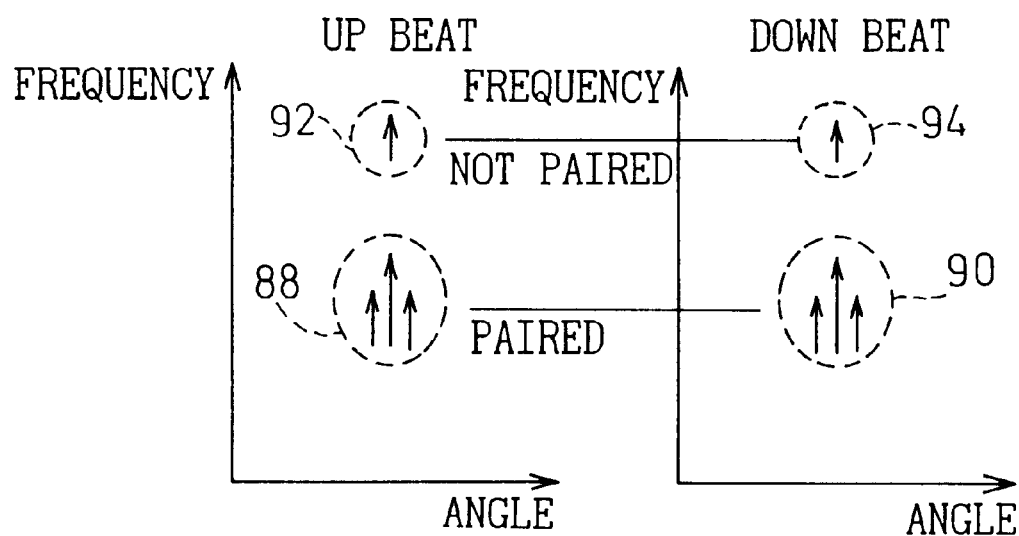
FIG. 15 is a diagram for explaining grouping of peaks and a method of detecting noise peaks.

As indicated by reference numerals 88 and 90 in FIG. 15, a target usually has a finite lateral width, and a plurality of peaks equal in frequency occur over a finite angle range; therefore, these peaks are grouped together and treated as one peak. In view of this, if the number of peaks belonging to the same group is smaller than a predetermined value, for example, if the peak group consists of only one peak, as shown by reference numerals 92 and 94, it is desirable to treat such peaks as noise. However, if such a peak has an intensity greater than a predetermined threshold value, it is preferable to treat it as a peak, not as noise.

As described above, according to the first aspect of the present invention, since the occurrence of a ghost due to mispairing, wall reflections, or the like is suppressed, the measurement accuracy increases.

Figure 16:
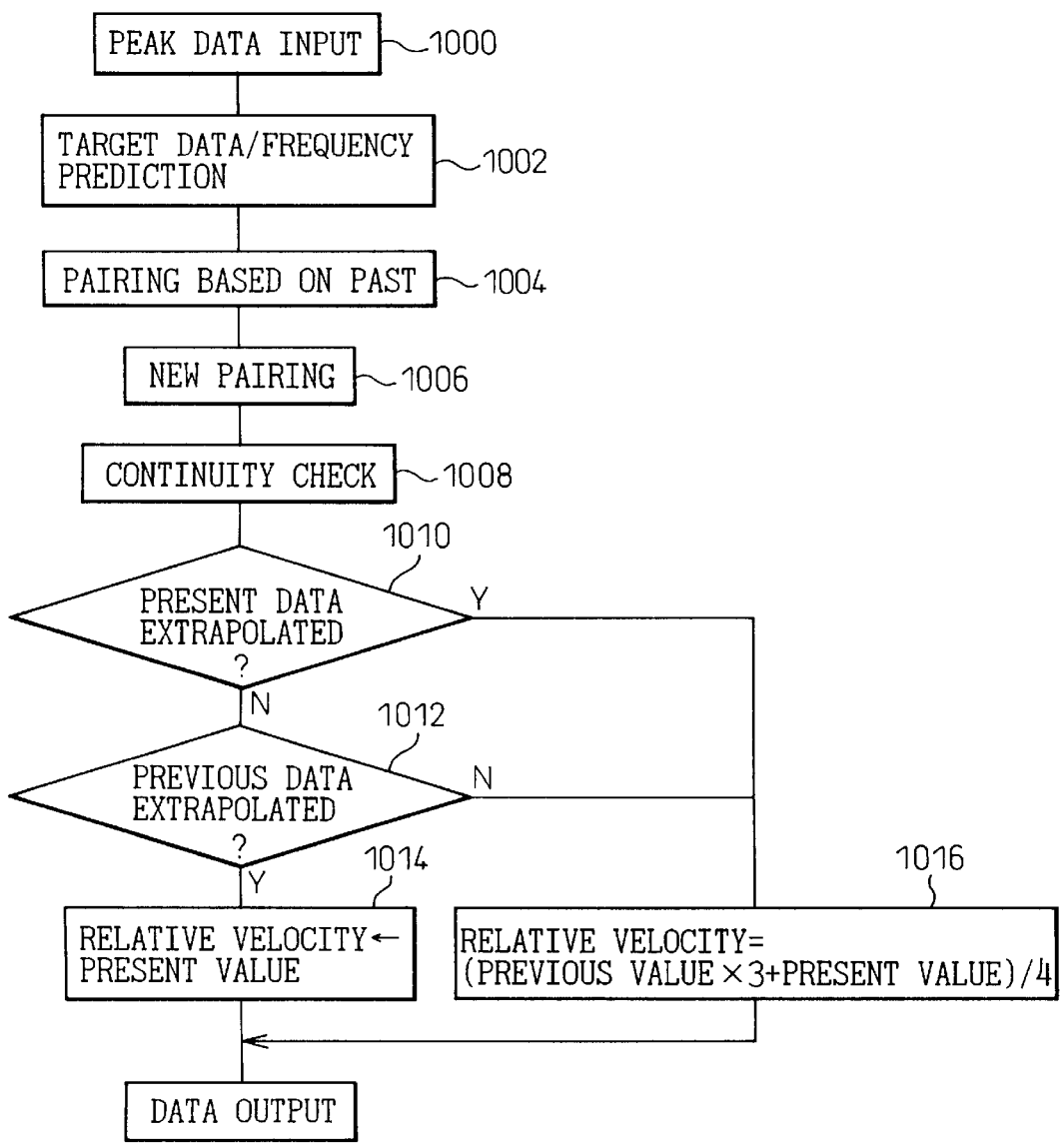
FIG. 16 is a simplified flowchart showing one example of the process from peak data input to data output to be performed in the microcomputer 30.

FIG. 16 is a simplified flowchart showing one example of the process from peak data input to data output to be performed in the microcomputer 30.

In FIG. 16, first, peak data is input from the DSP 28 (step 1000). The predicted values of the present target data (distance and relative velocity) and the predicted values of peak frequencies are calculated from the previous data (step 1002, details described previously), and pairing based on the past is tried (step 1004, details described previously). Next, new pairing is tried on the remaining peaks (step 1006, details described previously). The distance and relative velocity are calculated from the frequencies of the paired peaks, and continuity with the previous data is checked (step 1008, details described previously). If the data is outside the range predicted from the previous data, data calculated by extrapolation for a predetermined period of time is taken as the target data.

If the present data is not one calculated by extrapolation (step 1010), and if the previous target data is one calculated by extrapolation (step 1012), filtering calcultions are not performed for the calculation of the relative velocity, but the present value is taken as the final value of the relative velocity for the present data (step 1014); in other cases, filtering calculations are performed for the calculation of the relative velocity (step 1016).

Figure 1:
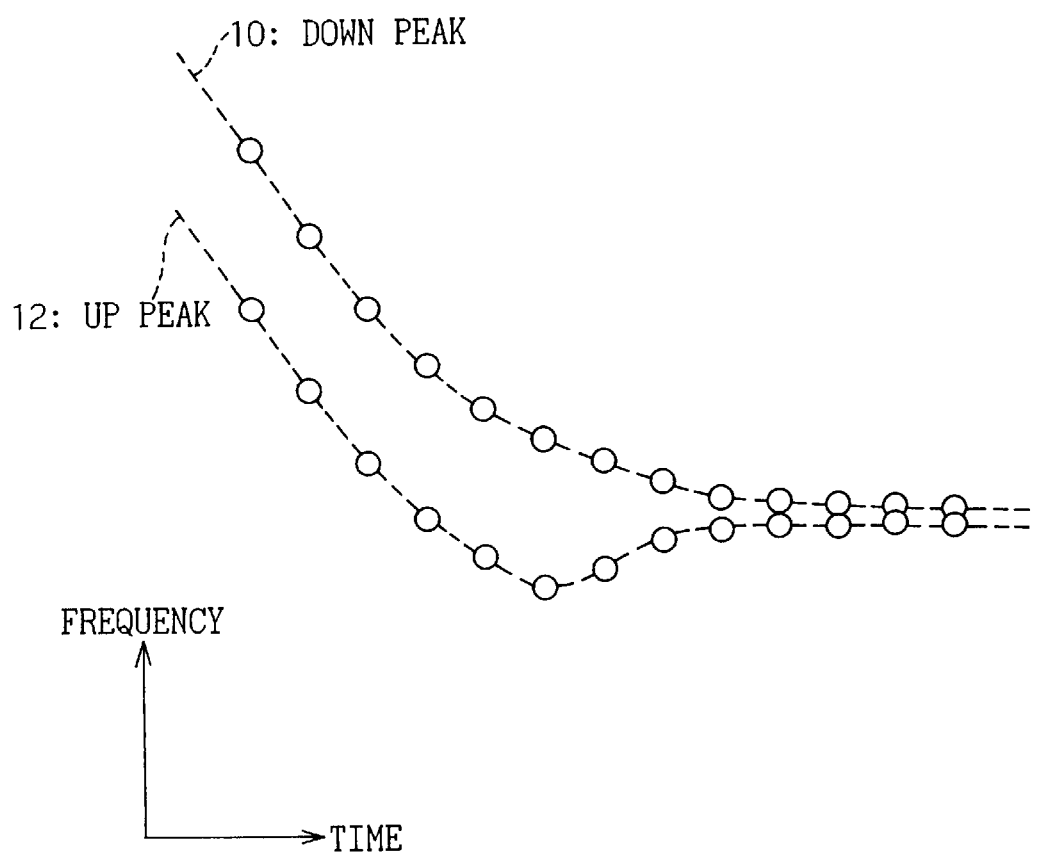
FIG. 1 is a diagram showing how the peak frequencies vary when the distance to a vehicle traveling in front temporarily decreases and then settles down to maintain a constant distance.
Figure 2:
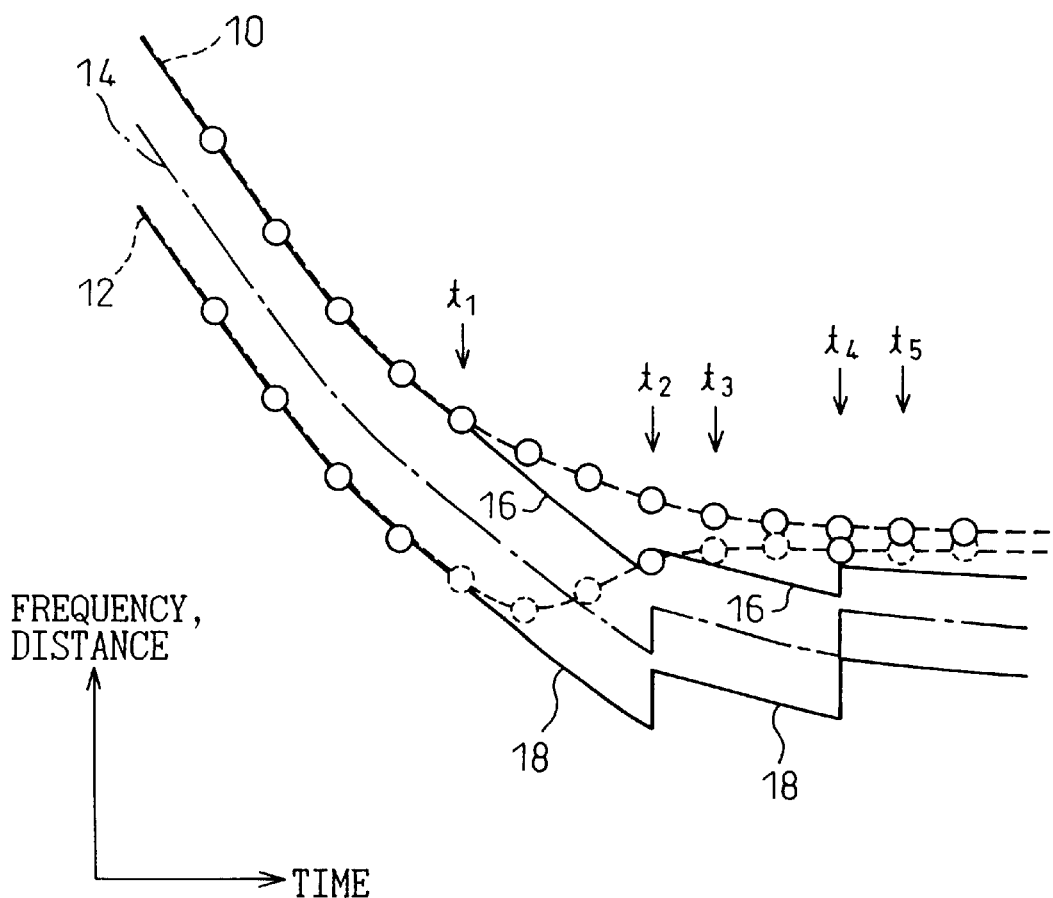
FIG. 2 is a diagram for explaining a problem associated with the prior art.
Figure 17:
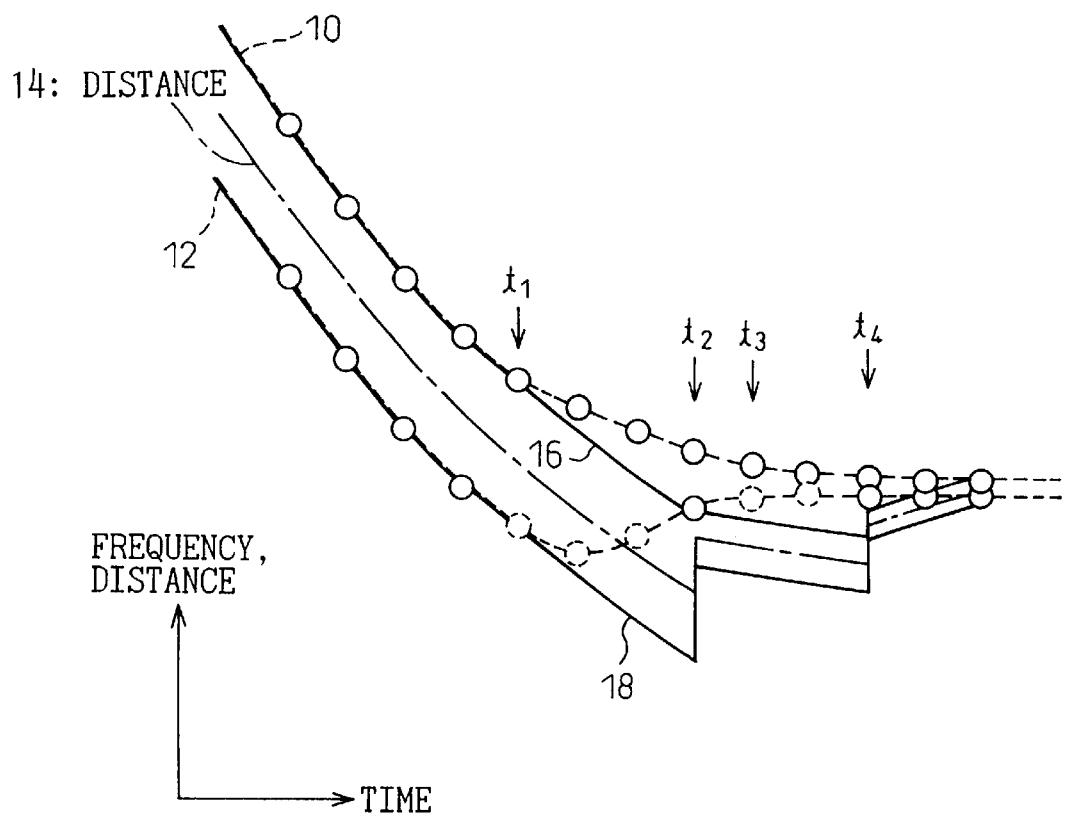
FIG. 17 is a diagram for explaining the operation in the situation described with reference to FIGS. 1 and 2.

FIG. 17 is a diagram for explaining the operation in the situation described with reference to FIGS. 1 and 2. The operation up to time $t_2$ is the same as that previously described in connection with FIG. 2, but when performing the new pairing at time $t_2$, filtering calculations are not performed for the calculation of the relative velocity, so that the predicted values of the peak frequencies become closer to the actual values. If the down beat extrapolation is resumed at time $t_3$, as the predicted values are brought closer to the actual measured values, both the up peak and down peak come within the predicted range after the new pairing at time $t_4$ and, as the pairing based on the past can be performed here, the predicted values converge to the actual measured values.

As described above, according to the second aspect of the present invention, there is provided a radar data processing apparatus that can quickly track targets even when the actual relative velocity changes by more than a certain value during extrapolation, such as when the distance to the vehicle traveling in front decreases and then settles down to maintain a constant distance.

What is claimed is:

1. A data processing apparatus for a millimeter-wave radar, which receives data concerning peaks appearing in a frequency spectrum of a beat signal produced by mixing a received signal with a portion of a transmitted signal frequency-modulated by a triangular wave increasing and decreasing alternately in a cyclic fashion, and which processes the peak data for the increasing and decreasing sections of the triangular wave for a plurality of angles, comprising:

part for determining pairing between peaks in the increasing section of the triangular wave and the corresponding peaks in the decreasing section thereof;

part for calculating, from frequencies of the paired peaks, distance to each individual target and relative velocity of the target; and part for determining an ineligible target based on the calculated relative velocity.

2. A data processing apparatus for a millimeter-wave radar according to claim 1, further comprising part for determining whether each individual target is a stationary target or a moving target, based on a traveling speed of a vehicle equipped with the radar and the relative velocity of the target, wherein the ineligible target determining part determines that a moving target that, according to the calculated values of the distance and relative velocity, is supposed to be present in the vicinity of a stationary target is an ineligible target.

3. A data processing apparatus for a millimeter-wave radar according to claim 1, further comprising part for determining an eligible target based on continuity with past data, wherein the ineligible target determining part determines that a target that, according to the calculated values of the distance and relative velocity, is expected to virtually collide with the eligible target is an ineligible target.

4. A data processing apparatus for a millimeter-wave radar according to claim 1, wherein the ineligible target determining part determines that a target for which the calculated value of the relative velocity is an unlikely value is an ineligible target.

5. A data processing apparatus for a millimeter-wave radar according to claim 1 wherein, when there are two moving targets exhibiting substantially the same motion according to the calculated values of the distance and relative velocity, the ineligible target determining part determines that a moving target located outward of the other target is an ineligible target.

6. A data processing apparatus for a millimeter-wave radar according to claim 1, further comprising part for determining whether each individual target is a stationary target or a moving target, based on a traveling speed of a vehicle equipped with the radar and the relative velocity of the target, wherein the ineligible target determining part determines that a moving target that is located outward of a stationary target according to the calculated values of the distance and relative velocity is an ineligible target.

7. A data processing apparatus for a millimeter-wave radar, which receives data concerning peaks appearing in a frequency spectrum of a beat signal produced by mixing a received signal with a portion of a transmitted signal frequency-modulated by a triangular wave increasing and decreasing alternately in a cyclic fashion, and which processes the peak data for the increasing and decreasing sections of the triangular wave for a plurality of angles, comprising:

part for determining pairing between peaks in the increasing section of the triangular wave and the corresponding peaks in the decreasing section thereof;

part for calculating, from frequencies of the paired peaks, a distance to each individual target and a relative velocity of the target;

part for grouping together peaks substantially equal in frequency and distributed within a prescribed angle range, by determining that the peaks are due to reflections from the same target; and part for determining that, if a number of peaks belonging to the same group is smaller than a predetermined value, the peaks belonging to the same group are ineligible peaks.

8. A data processing apparatus for a millimeter-wave radar according to claim 7, wherein the ineligible peak determining part determines that a peak having an intensity greater than a predetermined threshold value is an eligible peak even when the number of peaks belonging to the same group is smaller than the predetermined value.

9. A radar data processing apparatus comprising:

part for checking continuity to determine whether previously obtained target data and currently obtained target data are data obtained from the same target;

part for performing filtering calculations on the target data that has been determined as being data from the same target as a result of the continuity check; and part for prohibiting the filtering calculations from being performed for the calculation of the relative velocity of the target contained in the target data, if the currently obtained target data is data calculated from currently obtained actual measured values, and if the previously obtained target data is data calculated by extrapolation, not from actual measured values.

10. A data processing method for a millimeter-wave radar, which receives data concerning peaks appearing in a frequency spectrum of a beat signal produced by mixing a received signal with a portion of a transmitted signal frequency-modulated by a triangular wave increasing and decreasing alternately in a cyclic fashion, and which processes the peak data for the increasing and decreasing sections of the triangular wave for a plurality of angles, comprising the steps of:

determining pairing between peaks in increasing section of the triangular wave and the corresponding peaks in decreasing section thereof;

calculating, from frequencies of the paired peaks, distance to each individual target and relative velocity of the target; and determining an ineligible target based on the calculated relative velocity.

11. A data processing method for a millimeter-wave radar according to claim 10, further comprising the step of determining whether each individual target is a stationary target or a moving target, based on a traveling speed of a vehicle equipped with the radar and the relative velocity of the target wherein, in the step of determining an ineligible target, a moving target that, according to the calculated values of the distance and relative velocity, is supposed to be present in the vicinity of a stationary target is determined as being an ineligible target.

12. A data processing method for a millimeter-wave radar according to claim 10, further comprising the step of determining an eligible target based on continuity with past data, wherein in the step of determining an ineligible target, a target that, according to the calculated values of the distance and relative velocity, is expected to virtually collide with the eligible target is determined as being an ineligible target.

13. A data processing method for a millimeter-wave radar according to claim 10 wherein, in the step of determining an ineligible target, a target for which the calculated value of the relative velocity is an unlikely value is determined as being an ineligible target.

14. A data processing method for a millimeter-wave radar according to claim 10 wherein, in the step of determining an ineligible target, when there are two moving targets exhibiting substantially the same motion according to the calculated values of the distance and relative velocity, a moving target located outward of the other target is determined as being an ineligible target.

15. A data processing method for a millimeter-wave radar according to claim 10, further comprising the step of determining whether each individual target is a stationary target or a moving target, based on a traveling speed of a vehicle equipped with the radar and the relative velocity of the target, wherein, in the step of determining an ineligible target, a moving target that is located outward of a stationary target according to the calculated values of the distance and relative velocity is determined as being an ineligible target.

16. A data processing method for a millimeter-wave radar, which receives data concerning peaks appearing in a frequency spectrum of a beat signal produced by mixing a received signal with a portion of a transmitted signal frequency-modulated by a triangular wave increasing and decreasing alternately in cyclic fashion, and which processes the peak data for the increasing and decreasing sections of the triangular wave for a plurality of angles, comprising the steps of:

determining pairing between the peaks in the increasing section of the triangular wave and the corresponding peaks in the decreasing section thereof;

calculating, from frequencies of the paired peaks, distance to each individual target and relative velocity of the target;

grouping together peaks substantially equal in frequency and distributed within a prescribed angle range, by determining that the peaks are due to reflections from the same target; and determining that, if a number of peaks belonging to the same group is smaller than a predetermined value, the peaks belonging to the same group are ineligible peaks.

17. A data processing method for a millimeter-wave radar according to claim 16, wherein in the step of determining an ineligible peak, a peak having an intensity greater than a predetermined threshold value is determined as being an eligible peak even when the number of peaks belonging to the same group is smaller than the predetermined value.

18. A radar data processing method comprising the steps of:

checking continuity to determine whether previously obtained target data and currently obtained target data are data obtained from the same target;

performing filtering calculations on the target data that has been determined as being data from the same target as a result of the continuity check; and prohibiting the filtering calculations from being performed for the calculation of the relative velocity of the target contained in the target data, if the currently obtained target data is data calculated from currently obtained actual measured values, and if the previously obtained target data is data calculated by extrapolation, not from actual measured values.

\* \* \* \* \*